United States Patent Office 3,505,015
Patented Apr. 7, 1970

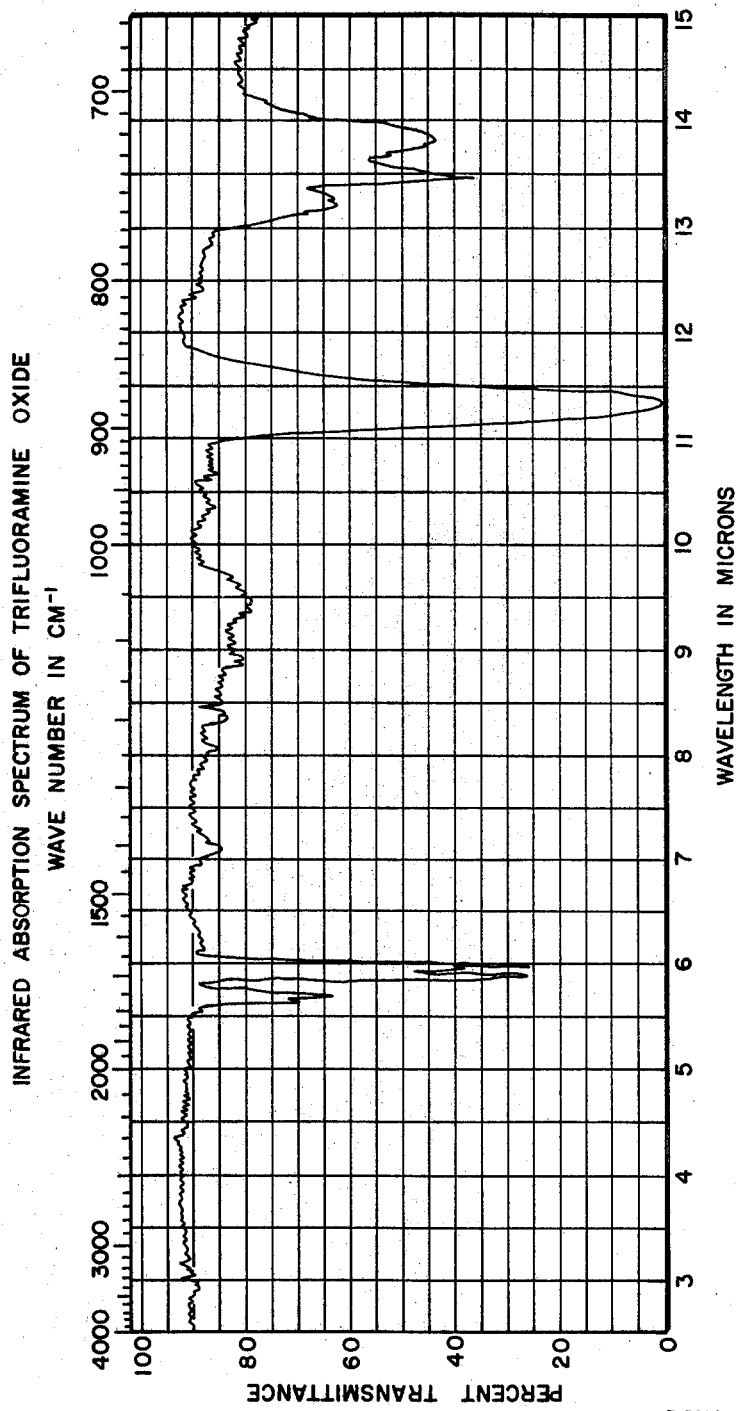

3,505,015
PROCESS FOR THE PREPARATION OF
TRIFLUORAMINE OXIDE
Emil A. Lawton, Woodland Hills, and Donald Pilipovich, Chatsworth, Calif., assignors to North American Rockwell Corporation, a corporation of Delaware
Filed Sept. 29, 1961, Ser. No. 142,459
Int. Cl. C01b 11/24, 21/52
U.S. Cl. 23—203
2 Claims

ABSTRACT OF THE DISCLOSURE

Trifluoramine oxide having the formula $ONF_3$ and the preparation thereof by reacting in the gas phase difluoramine, chlorine, trifluoride, and a compound of halogen and oxygen.

---

This invention relates to a novel compound containing oxygen, nitrogen, and fluorine.

It is an object of this invention to provide a new compound containing nitrogen, oxygen, and fluorine, which compound has numerous utilities in the chemical arts. A further object of this invention is to provide a method for the preparation of this novel compound.

The object of this invention are accomplished by the compound trifluoramine oxide having the formula $ONF_3$. Trifluoramine oxide is a colorless gas and has a melting point of $-161.5 \pm 1.0°$ C., and a boiling point of about $-89°$ C. calculated from vapor pressure data. The compound is thermally stable to above $300°$ C. and has a molecular weight of 87. It is relatively stable in acid solution, does not hydrolize readily in water, and hydrolizes only slowly in concentrated alkali. Trifluoramine oxide is reduced by acidified potassium iodide solution.

Trifluoramine oxide is a high performance oxidizer and, since it is a liquid under cryogenic conditions, finds utility in the field of liquid rocket propellants. The compound is a much more effective oxidizer than chlorine trifluoride with certain fuels. It is, furthermore, useful as an intermediate in the preparation of other compounds containing nitrogen-to-halogen bonds.

In the majority of tis reactions, trifluoramine oxide reacts as if it has the formula $ONF_3$, with each of the fluorine atoms and oxygen atoms bonded to the nitrogen. However, in some reactions, the compound reacts as the ions $NF_2O^+$ and $F^-$.

Trifluoramine oxide, the novel compound of this invention, may be prepared by reacting difluoramine with chlorine trifluoride and and oxyenated halogen compound such as $ClO_2$, $FClO_2$, and $FClO_3$.

The reaction between difluoramine, chlorine trifluoride and the oxygenated halogen compound is conducted in the gas phase. The gaseous reactants are cooled to a condensed phase in separate layers at temperature below $-126°$ C. For the condensation, temperatures between $-126°$ C. and $-196°$ C. may be employed. After the reactants are condensed, the temperature is raised to above $-126°$ C. and the gas phase reaction allowed to proceed at temperatures between about $-126°$ C. and $30°$ C. Preferred reaction temperatures are from about $-85°$ C. to about $20°$ C. The reaction is substantially complete within 15 minutes, but reaction times from 1 minutes to 24 hours may be employed. After the reaction is complete, the gaseous reaction products are condensed in a vacuum system through a series of cold traps ranging from $-112°$ C. to $-196°$ C. It is preferred to employ traps at $-112°$ C., $-142°$ C., $-156°$ C., and $-196°$ C. to initially recover trifluoramine oxide from the reaction mixture. Trifluoramine ovide condenses in the $-196°$ C. trap along with some impurities. Several procedures may be employed to free the trifluoramine oxide of the impurities depending upon the nature of the reaction vessel initially employed in its preparation. However, one method which may be successfully employed involves repurifying the material collected in the trap at $-196°$ C. through a trap at $-183°$ C., thus eliminating $NF_3$ as an impurity.

This system of condensing, revaporizing, and recondensing gases is conducted in a vacuum system and the above temperatures refer to a system employing a vacuum of from $10^{-3}$ to $10^{+4}$ mm. of mercury.

If the reaction is conducted in glass apparatus, silicon tetrafluoride tends to form by the reaction of the fluorine-containing compounds with the glass. $SiF_4$ may be removed from trifluoramine oxide by complexing the $SiF_4$ with an alkali metal fluoride such as potassium fluoride, the $NF_3O$ being unaffected. Nitrosylchloride, $NO_2$, chlorodifluoramine, NO, tetrafluorohydrazine, $NF_3$, and the starting materials, including chlorine trifluoride and difluoramine may be present in the initial reaction mixture. It is preferred to conduct the reaction under conditions whereby no difluoramine exists in the final reaction product. Nitrosylchloride, $NO_2$, and chlorodifluoramine can be removed from the initial reaction mixture in the $-156°$ trap while any NO produced is not condensable at $-196°$ C. and is separated by passing out of the system. Any chlorine and oxygenated halogen compounds are generally removed in the $-142°$ trap. Tetrafluorohydrazine may be removed by recondensing the reaction product through trap cooled to $-156°$ C. and $-183°$ C. Much of the tetrafluorohydrazine is condensed in the trap at $-156°$ C. and refractionation of the once purified material in the $-183°$ C. trap leads to trifluoramine oxide free of tetrafluorohydrazine. However, tetrafluorohydrazine may be separated from trifluoramine oxide by vapor partition chromatography using a column packed with a solid polychlorotrifluoroethylene and polychlorotrifluoroethylene oil as the stationary liquid phase.

The compound of this invention may also be prepared by the reaction of difluoramine with chlorine trifluoride and an oxygenated halogen compound in the presence of an alkali metal fluoride such as LiF, NaF, KF, CaF, and RbF as a complexing agent for the difluoramine. In this modification of the reaction, the difluoramine is first condensed on the solid alkali metal fluoride. The alkali metal fluoride-difluoramine mixture is then warmed to about $-80°$ C. in order to form a complex of the material. The complex is then recooled and the remaining reactants condensed into the reaction vessel at temperatures below the reaction temperature. The mixture is then warmed to reaction temperature and the reaction conducted as described above.

Trifluoramine oxide, the novel compound of this invention, may be identified by its characteristic infrared spectrum which is shown in the attached drawing. The compound exhibits strong asborptions at 530 cm.$^{-1}$, 743 cm.$^{-1}$, 885 cm.$^{-1}$, 1690 cm.$^{-1}$ and 1771 cm.$^{-1}$.

Samples of the compound were subjected to mass spectral analysis and the mass cracking pattern in a Consolidated 21-103C mass spectrometer employing an ionizing current of 25 ma. and magnet currents of 0.005 and 0.008, indicated m/e peaks at 68 (assignable to $NF_2O^+$); and 87 (assignable to $NF_3O^+$). In addition, peaks assignable to $N^+$, $O^+$, $NFO^{++}$, $NO^+$, $NF^+$, $NF_2^+$, $F^+$ and other minor impurities were observed.

The compound, trifluoramine oxide is reduced by potassium iodide according to the equation

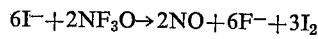

A sample of the compound was treated with excess of potassium iodide and the free iodine determined by titration with thio sulphate. By this method it is demonstrated that the compound yields three equivalents of iodine per mole. Since NO is produced by this reaction, a complete chemical analysis is obtained by determining the amount of NO produced in the reaction with acid iodide ion.

The molecular weight of purified sample of the compound was determined by the gas density method. In one such determination, 34.4 milligrams of the compound occupied a volume of 8.84 cc. under standard conditions of temperature and pressure. In another determination, 40.4 milligrams occupied a volume of 10.3 cc. From these determinations, an average molecular weight of 87.5 was determined for the compound, which corresponds very well with the calculated molecular weight of 87.

The following examples, in which all parts and percentages are given by weight, illustrate the novel compound of this invention, its preparation, and use.

EXAMPLE 1

A reaction vessel prepared from a solid polychlorotrifluoroethylene was equipped with cooling means and means for admitting and discharging gaseous reactants. The vessel was then cooled to $-142°$ C. and attached to a vacuum system containing a series of cold traps. The reaction vessel was separated from the vacuum system and charged with 675 parts of difluoramine and 607 parts of chlorinetrifluoride containing an unknown amount of chlorine dioxide as an impurity. While the reaction vessel was separated from the vacuum line the mixture was allowed to warm to room temperature. The original reactants had a total volume of 1280 parts at standard conditions prior to the reaction, and after the reaction the total volume was found to be 1150 parts. The mixture was then fractionated by condensation through cold traps in the vacuum system at $-142°$ C. and $-196°$ C. under vacuum conditions between $10^{-3}$ and $10^{-4}$ mm. of mercury. The $-196°$ C. trap contained 495 parts by volume at standard conditions of gas and this product contained trifluoramine oxide, tetrafluorohydrazine, chlorodifluoramine, and trace quantities of $NO_2$, nitrosyl chloride, and NO. Trifluoramine oxide is recovered in essentially pure form from this mixture by refractionation of the product through traps at $-156°$ C. and $-196°$ C. to eliminate all impurities except tetrafluorohydrazine. The tetrafluorohydrazine is removed by successive refractionation through traps at $-156°$ C. and $-183°$ C.

EXAMPLE 2

The procedure of Example 1 was followed employing 705 parts of chlorinetrifluoride contaminated with chlorine dioxide and 332 parts of difluoramine. In this example, the reaction product was immediately refractionated through cold traps at $-142°$ C. and $-196°$ C. to yield 135 parts of trifluoramine oxide contaminated with a small amount of silicon tetrafluoride. The $SiF_4$ is conveniently removed by complexing with potassium fluoride.

EXAMPLE 3

Again following the procedure of Example 1, 359 parts of difluoramine were added to a solid polychlorotrifluoroethylene reaction vessel which had been previously charged with 2380 parts of sodium fluoride. The reaction vessel was then cooled to $-196°$ C. and 658 parts of chlorine trifluoride containing a small amount of chlorine dioxide was condensed into the vessel. The reaction vessel was then warmed to $-65°$ C. and allowed to remain at this temperature for about 90 minutes. At the end of the reaction time, gases produced in the reaction were condensed in cold traps at $-95°$ C., $-160°$ C., and $-196°$ C. under high vacuum. In the trap at $-196°$ C., 131 parts of trifluoramine oxide were recovered. Good results are also obtained when potassium fluoride, rubidium fluoride, or cesium fluoride are employed as the alkali metal fluoride; and $FClO_2$ or $FClO_3$ may be substituted for the chlorine dioxide.

EXAMPLE 4

Following the procedure of Example 3, 2380 parts of sodium fluoride were charged to the reaction vessel and the vessel was cooled to $-142°$ C. and subjected to high vacuum conditions. Into the reaction vessel, 314 parts of difluoramine were condensed and the vessel was then cooled to $-196°$ C. and charged with 770 parts of purified chlorine trifluoride. Chlorine dioxide (423 parts) produced by the reaction of sulfuric acid, potassium chlorate, and excess carbon dioxide was charged to the reaction vessel while the temperature was maintained at $-196°$ C. When all the reactants had been condensed into the reaction vessel, it was warmed to $-65°$ C. and maintained at this temperature for three hours, following which time the gaseous contents of the reaction vessel were fractionated through traps at $-142°$ C., $-160°$ C., and $-196°$ C. Trifluoramine oxide, 108 parts, and a trace of NO were recovered from the trap cooled to $-196°$ C.

EXAMPLE 5

A stainless steel reaction vessel, equipped with means for charging and discharging gaseous and liquid reactants, heating and cooling means, and means for sealing the vessel to conduct reactants at elevated temperatures, was cooled to $-196°$ C. and charged with 236 parts of trifluoramine oxide and 505 parts of chlorotrifluoroethylene. The reaction vessel was sealed and warmed to $100°$ C. and then heated at between $135°$ C. and $150°$ C. for two hours after the reaction. The reaction vessel was then cooled to room temperature slowly over a 40-minute period and attached, before opening, to a vacuum system containing traps cooled to $-142°$ C. and $-196°$ C. Unreacted chlorotrifluoroethylene is removed in the trap at $-142°$ C., while nitrogen trifluoride produced by the reaction is collected in the trap at $-196°$ C. Thus, trifluoramine oxide is useful in the preparation of nitrogen trifluoride.

An indicated above, the novel compound of this invention is an extremely high energy oxidizer and when employer with fuels in rocket engine combustion, yields extremely high impulses. With hydrazine in the ratio of 2 parts trifluoramine oxide to 1 part hydrazine, a specific impulse of 293 seconds is obtained. With pentaborane in the ratio of 6 parts by weight trifluoramine oxide to 1 part pentaborane, a specific impulse of 310 seconds is achieved. The above figures are based on a heat of formation of $-72$ kilo calories per gram mole of trifluoramine oxide and on an assumed chamber pressure of 100 p.s.i., expanding to 1 atmosphere. The efficiency of the compound is given in terms of seconds of specific impulse, as specific impulse is the parameter which describes the efficiency of a rocket propellant. Specific impulse is defined as the pounds of thrust produced per pound of propellant consumed per second. The performance of propellant compositions in which trifluoramine oxide is the oxidizer may be compared to similar compositions containing hydrazine and $N_2O_4$ and pentaborane and $ClF_3$. In these instances, specific impulses of 292 and 290 are obtained from compositions giving optimum performance.

We claim:
1. A process for the preparation of trifluoramine oxide which comprises reacting gaseous difluoramine with gaseous chlorine trifluoride and a gaseous compound containing only halogen and oxygen thereby to produce trifluoramine oxide, and recovering at least part of the trifluoramine oxide so produced.

2. The process for the preparation of trifluoramine oxide from difluoramine with chlorine trifluoride and $ClO_2$ as reactants the process comprising the steps of condensing said reactants, allowing the condensed reactants to warm sufficiently for conversion of each reactant to vapor, mixing the vapors of the three reactants together whereby they react to form trifluoramine oxide, and recovering at least part of the trifluoramine oxide so produced.

No references cited.

EDWARD J. MEROS, Primary Examiner